(12) United States Patent
Erschen et al.

(10) Patent No.: US 10,046,884 B1
(45) Date of Patent: Aug. 14, 2018

(54) RETURNABLE SHIPPING CARTRIDGE AND RACK

(71) Applicant: Lean Manufacturing Products, Inc., Waukesha, WI (US)

(72) Inventors: Jacob Erschen, Pewaukee, WI (US); Dan Erschen, Pewaukee, WI (US)

(73) Assignee: LEAN MANUFACTURING PRODUCTS, INC., Waukesha, WI (US)

( * ) Notice: Subject to any disclaimer, the term of this patent is extended or adjusted under 35 U.S.C. 154(b) by 0 days.

(21) Appl. No.: 15/609,636

(22) Filed: May 31, 2017

(51) Int. Cl.
    *B65D 19/00* (2006.01)
    *B65D 19/38* (2006.01)
    (Continued)

(52) U.S. Cl.
    CPC ....... *B65D 19/0091* (2013.01); *B65D 19/385* (2013.01); *B65G 57/005* (2013.01); *B65G 57/03* (2013.01); *B65D 2519/0096* (2013.01); *B65D 2519/00273* (2013.01); *B65D 2519/00965* (2013.01)

(58) Field of Classification Search
    CPC .. B65D 19/44; B65D 19/0012; B65D 19/385; B65D 19/40; B65D 2519/00572; B65D 2519/00985; B65D 2519/0099; B65D 19/0095; B65D 19/38; B65D 2519/00024; B65D 2519/00059; B65D 2519/00094; B65D 2519/00273; B65D 2519/00293; B65D 2519/00323; B65D 2519/009373; Y10T 403/55; Y10T 403/33; Y10T 403/335; B64C 1/20; B64C 1/22

USPC ........ 108/55.1, 51.3, 51.11, 53.1, 53.3, 53.5, 108/56.1, 56.3, 57.29, 57.31, 57.32, 108/57.33, 57.17, 57.18, 57.19, 16, 12,
(Continued)

(56) References Cited

U.S. PATENT DOCUMENTS 3,012,762 A * 12/1961 Norris ....................... F24F 1/00
    126/110 R
3,521,764 A * 7/1970 Loomis .............. B65D 21/0209
    108/53.1
(Continued)

FOREIGN PATENT DOCUMENTS

| EP | 0207479 | * | 1/1987 |
| EP | 2687454 | * | 1/2014 |
| GB | 2537147 | * | 10/2016 |

*Primary Examiner* — Janet M Wilkens
(74) *Attorney, Agent, or Firm* — Michael Best & Friedrich LLP (57) ABSTRACT

A material-supporting cartridge comprises a frame having an upper surface with an opening, and a pin removably positioned in the opening in a first orientation with a first end of the pin positioned in the frame and a second end of the pin positioned a first height above the upper surface. The pin is dimensioned to be removed and inserted into the opening in a second orientation with the second end of the pin positioned in the frame and the first end of the pin positioned a second height above the upper surface, the first height being greater than the second height. The frame further includes a support tube dimensioned to receive the pin in each of the first and second orientations. The material-supporting cartridge can be used with a rack that defines multiple stacked rows having a vertical spacing between adjacent rows, the vertical spacing being greater than the second height.

20 Claims, 11 Drawing Sheets

(51) Int. Cl.
*B65G 57/00* (2006.01)
*B65G 57/03* (2006.01)

(58) Field of Classification Search
USPC .......... 108/19, 91; 248/220.21, 220.22, 159, 248/558, 544; 312/111, 198
See application file for complete search history.

(56) References Cited

U.S. PATENT DOCUMENTS

| | | | |
|---|---|---|---|
| 4,275,939 A * | 6/1981 | Odermann | D05B 75/02 |
| | | | 112/258 |
| 4,915,033 A | 4/1990 | Bond | |
| 4,977,836 A | 12/1990 | Bond | |
| 5,316,428 A * | 5/1994 | Charping | B65G 1/02 |
| | | | 211/134 |
| 5,400,904 A * | 3/1995 | Maston, III | H01L 21/67333 |
| | | | 206/509 |
| 5,809,906 A | 9/1998 | Janek | |
| 5,971,592 A | 10/1999 | Kralj et al. | |
| 6,638,002 B1 | 10/2003 | Martin | |
| 6,742,663 B2 | 6/2004 | Chubb | |
| 7,044,066 B1 | 5/2006 | Miller | |
| 8,505,469 B2 | 8/2013 | Liu et al. | |
| 9,340,322 B2 | 5/2016 | Harris | |
| 9,493,295 B2 | 11/2016 | Glover et al. | |
| 9,708,122 B1 | 7/2017 | Johncox | |
| 2004/0089993 A1 | 5/2004 | Martin et al. | |
| 2006/0086881 A1* | 4/2006 | Miller | A47B 1/005 |
| | | | 248/346.01 |
| 2008/0250986 A1 | 10/2008 | Boon | |
| 2014/0360552 A1 | 12/2014 | Britcher et al. | |
| 2017/0267450 A1 | 9/2017 | Johncox | |

* cited by examiner

RETURNABLE SHIPPING CARTRIDGE AND RACK

BACKGROUND

The present invention relates generally to returnable and reusable shipping pallets, sometimes referred to as cartridges, and a rack for storing such cartridges.

Sheet metal transport, storage, and staging is an expensive challenge for manufacturing facilities. Typically, stacks of sheet metal are supported on single-use wooden skids. The loaded skids can be stacked on top of each other, making it difficult to access sheet metal on the bottom of the stack. This causes inefficient working conditions and frustrated employees when they have to move numerous skids of material before gaining access to the one they actually need. Moving material takes time, machinery, labor, and often times it also creates scratched and warped material if not stacked and handled carefully. Alternatively, the loaded skids can be stored side-by-side, resulting in excessive use of valuable floor space.

SUMMARY

The present invention provides a material-supporting cartridge comprising a frame adapted to support an item and including a periphery including an upper surface with an opening, and a pin removably positioned in the opening in a first orientation with a first end of the pin positioned in the frame and a second end of the pin positioned a first height above the upper surface. The pin is dimensioned to be removed and inserted into the opening in a second orientation with the second end of the pin positioned in the frame and the first end of the pin positioned a second height above the upper surface, the first height being greater than the second height. In one embodiment, the frame includes a plurality of the openings around the periphery of the frame, and a plurality of the pins removably positioned in the openings. Preferably, the first end of each pin includes a first cross-sectional dimension and the second end of each pin includes a second cross-sectional dimension smaller than the first cross-sectional dimension. For example, the pin can include a first cylindrical portion defining the first end and a second cylindrical portion defining the second end, wherein a diameter of the first cylindrical portion is larger than a diameter of the second cylindrical portion.

The periphery of the frame is preferably formed by a truss having an upper wall, a lower wall, and a space between the upper and lower walls. The frame further includes a support tube aligned with the opening and connecting the upper wall to the lower wall. The support tube is dimensioned to receive the pin in each of the first and second orientations. The frame can further include a banding tube connecting the upper wall to the lower wall to provide a passageway through the periphery of the frame to facilitate insertion of a banding strap to secure the item. In one embodiment, the banding tube is positioned between the support tube and a corner of the frame. Preferably, there are a plurality of banding tubes and a plurality of the support tubes, and each corner of the frame is flanked by two banding tubes with no support tubes in between. The periphery of the frame can be at least partially formed by a C-shaped truss having an upper wall, a lower wall, and an outer wall such that an inner portion of the truss is at least partially open.

The above-described cartridge can be used with a rack to form a material-supporting cartridge and rack system. The rack defines multiple stacked rows having a vertical spacing between adjacent rows, and the vertical spacing is greater than the second height.

The present invention also provides a method of shipping and receiving a plurality of cartridges, each having a frame and a pin. The method comprises inserting a pin in a first orientation into an upper opening in each frame, placing an item onto each cartridge, stacking the cartridges such that the pin of one cartridge is inserted into a lower opening of a cartridge above, and moving the cartridges to a different location in batch orientation. In one embodiment, the step of inserting includes inserting a plurality of pins into a plurality of upper openings, the step of placing includes positioning the item between the plurality of pins, and the step of stacking includes inserting each of the pins into a corresponding lower opening in the cartridge above.

The method can further include the steps of repositioning the pin in a second orientation relative to the frame, and supporting the cartridge on a rack with the pin in the second orientation. Preferably, the first orientation corresponds with a first end of the pin positioned in the frame and a second end of the pin positioned a first height above an upper surface of the frame, the second orientation corresponds with the second end of the pin positioned in the frame and the first end of the pin positioned a second height above the upper surface, and the first height is greater than the second height.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
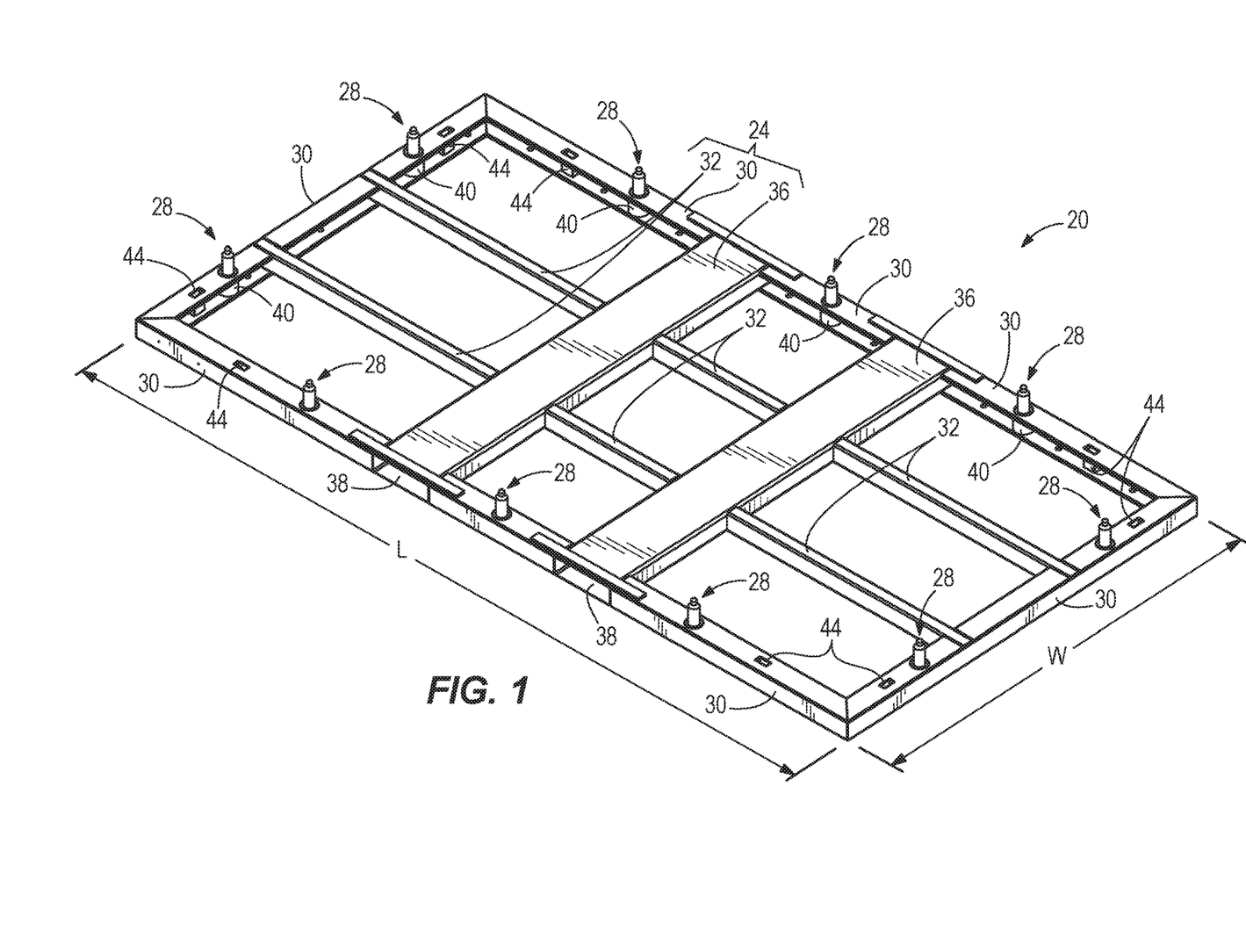
FIG. 1 is a perspective view of a reusable cartridge embodying the present invention.
Figure 2:
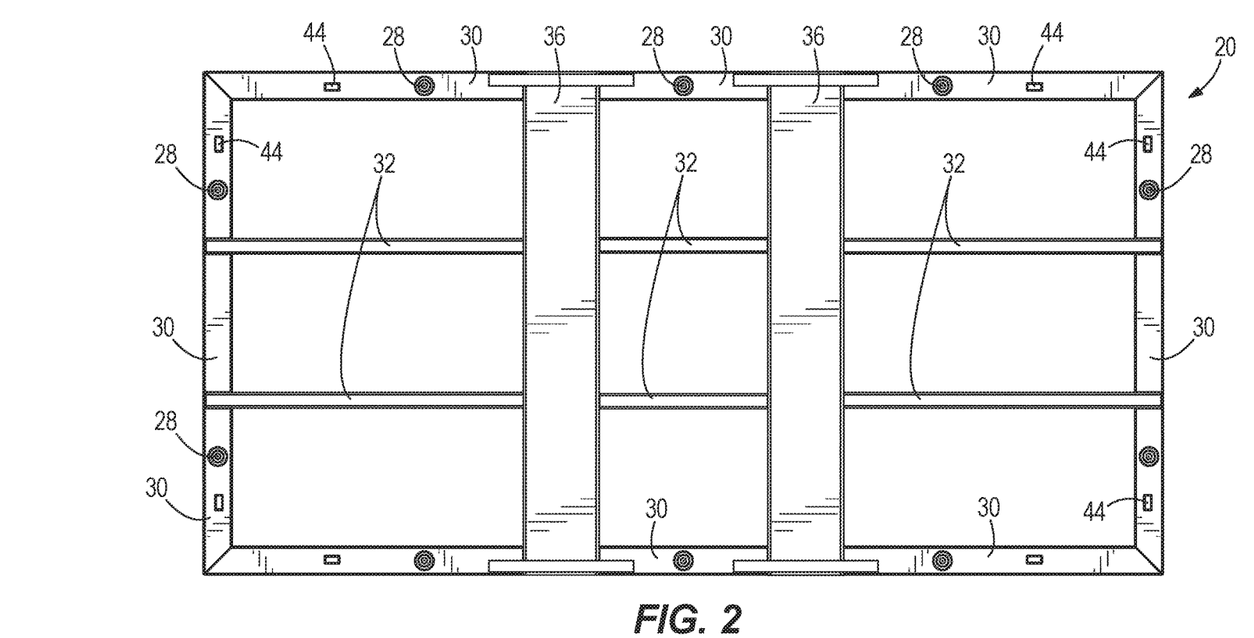
FIG. 2 is a top view of the cartridge of FIG. 1.
Figure 3:
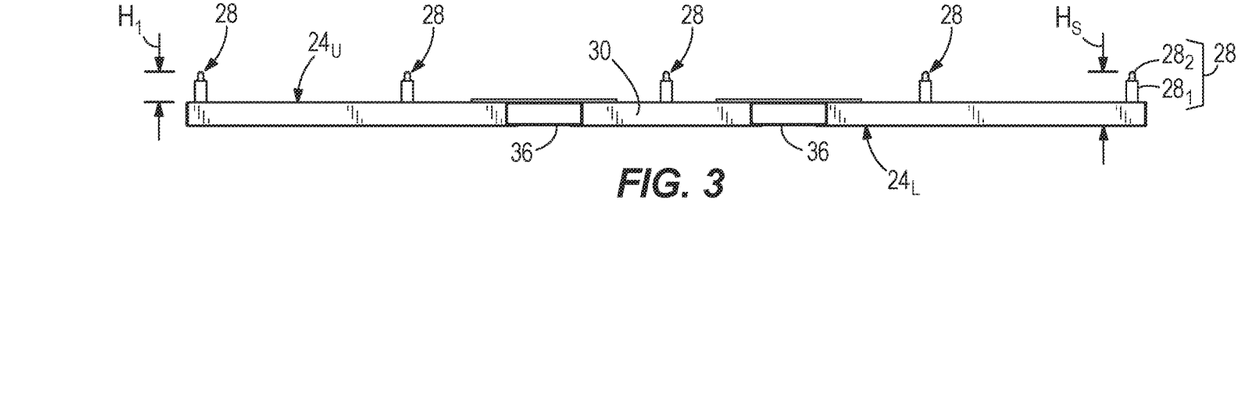
FIG. 3 is a front view of the cartridge of FIG. 1.

FIGS. 1 to 3 illustrate a material-supporting cartridge 20 including a frame 24 and a plurality of pins 28 removably supported in the frame 24. The frame 24 includes a plurality of perimeter members 30 defining an outer perimeter of the frame 24, a plurality of cross tubes 32, and a plurality of fork tubes 36 that have openings 38 on at least one edge of the outer perimeter to receive forks of a lifting apparatus (e.g., fork lift—not shown). The perimeter frame members 30, the cross tubes 32, and the fork tubes 36 can all be of any suitable material, such as metallic or alloy construction (e.g., steel, aluminum), and welded together at a plurality of weld joints. In some constructions, the frame 24 can be formed with more or fewer joints, and other means may be employed for securing the frame 24 together, such as threaded fasteners, rivets, bonding agents, etc., either in lieu of welding or in conjunction. Alternatively, the frame can be fabricated (e.g., molded) from a composite material.

As shown in FIG. 3, the illustrated frame 24 defines upper and lower surfaces $24_U$, $24_L$. The upper surface $24_U$ is defined jointly by all of the plurality of perimeter frame members 30, the cross tubes 32, and the fork tubes 36, or subsets of these, all of which are generally flat and define a common plane for supporting product. Disregarding the pins 28, the upper surface $24_U$ defines an upper surface of the cartridge 20. Similar to the upper surface $24_U$, the lower surface $24_L$ is defined jointly by all of the plurality of perimeter frame members 30, the cross tubes 32, and the fork tubes 36, or subsets of these, all of which are generally flat and define a common plane for supporting the frame 24, or the cartridge 20, on a floor or other support surface.

A plurality of pin-receiving bushings or support tubes 40 are provided in the frame 24. In particular, the support tubes 40 are positioned in the perimeter frame members 30 at defined intervals along both a length L and a width W of the frame 24. As described in further detail below, each support tube 40 is configured and dimensioned to receive a corresponding pin 28 in a first orientation (FIGS. 1-10) and a second opposite orientation (FIGS. 11-16). The illustrated construction includes three support tubes 40 supporting three pins 28 on each lengthwise edge of the frame 24, and two support tubes 40 supporting two pins 28 on each widthwise edge of the frame 24, but other configurations may also be suitable in other constructions. In the illustrated construction, each support tube 40 is welded into position on the frame 24. An upper end 40A of each support tube 40 defines a surface that is substantially flush with the upper surface $24_U$ of the frame 24, and a lower end 40B of each support tube 40 defines a surface that is substantially flush with the lower surface $24_L$ of the frame 24.

In addition to the support tubes 40, a plurality of banding tubes 44 are provided in the frame 24. Like the support tubes 40, the banding tubes 44 are positioned in the perimeter frame members 30. The banding tubes 44 are provided in pairs, with each pair located adjacent one of the corners of the frame 24 as shown (e.g., one banding tube 44 is positioned between a frame corner and one of the support tubes 40). In some constructions, as shown, each corner of the frame 24 is flanked by two banding tubes 44 with no support tubes 40 in between. However, the locations for the banding tubes 44 are not necessarily limited to the illustrated construction. The illustrated banding tubes 44 are welded into position on the frame 24. The banding tubes 44 define channels or tunnels through which one or more product-securing banding straps 48 (FIGS. 7-10) are routed to secure one or more items such as material sheets S to the frame 24.

Each of the perimeter frame members 30 is formed as an open cross-section truss as best shown in FIGS. 1 and 4-6. The perimeter frame members 30 are closed on three sides and open on one side. For example, each perimeter frame member 30 is constructed with an upper wall 52, a lower wall 54, and an outer wall 56. The walls 52, 54, 56 define a C-shape cross-section as shown herein that is open on an inner side toward an interior of the cartridge 20. Along an interior edge of the upper wall 52, a downwardly extending lip or flange 52A is provided, and likewise an upwardly extending lip or flange 54A is provided along an interior edge of the lower wall 54 so that the two flanges 52A, 54A extend toward each other. Though the flanges 52A, 54A extend toward each other, a combined height of the flanges 52A, 54A make up a minority of the overall height of the perimeter frame member 30. Each of the upper and lower walls 52, 54 further includes an opening 60 at each pin location for receiving one of the support tubes 40 as discussed further below. Though not separately detailed, it should be understood that the banding tubes 44 are received in additional apertures of the perimeter frame members 30, and the fitment and securement of the banding tubes 44 to the perimeter frame members 30 is similar to that of the support tubes 40.

Figure 4:
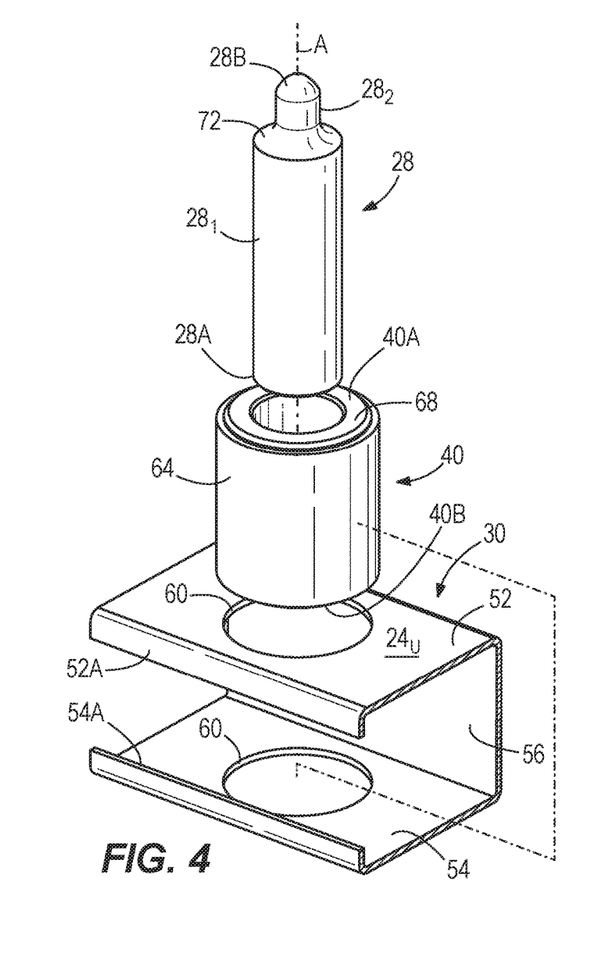
FIG. 4 is an exploded assembly view of a portion of the cartridge of FIG. 1, including a removable pin.
Figure 6:
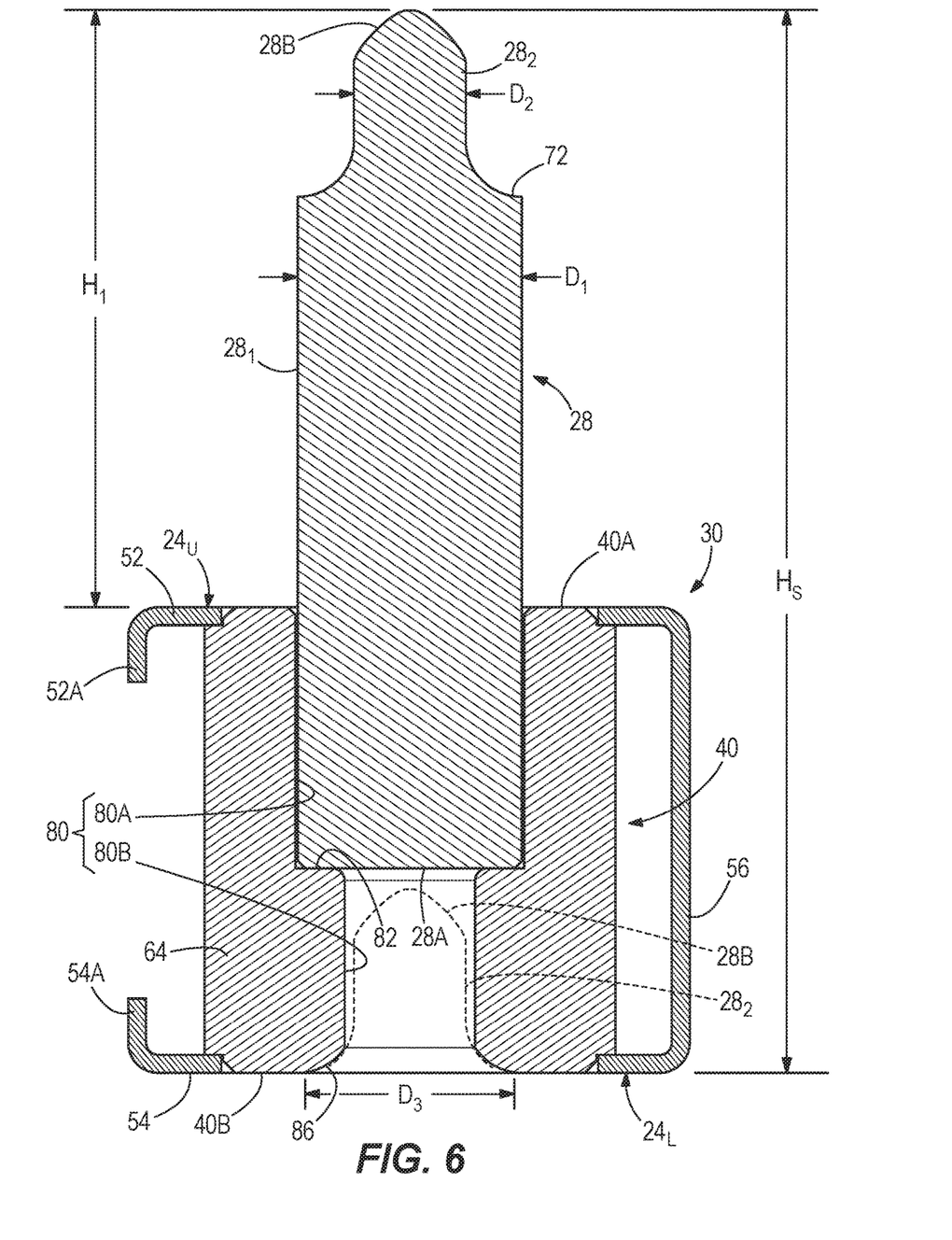
FIG. 6 is a section view taken along line 6-6 in FIG. 5, illustrating the pin in the stacking orientation.
Figure 7:
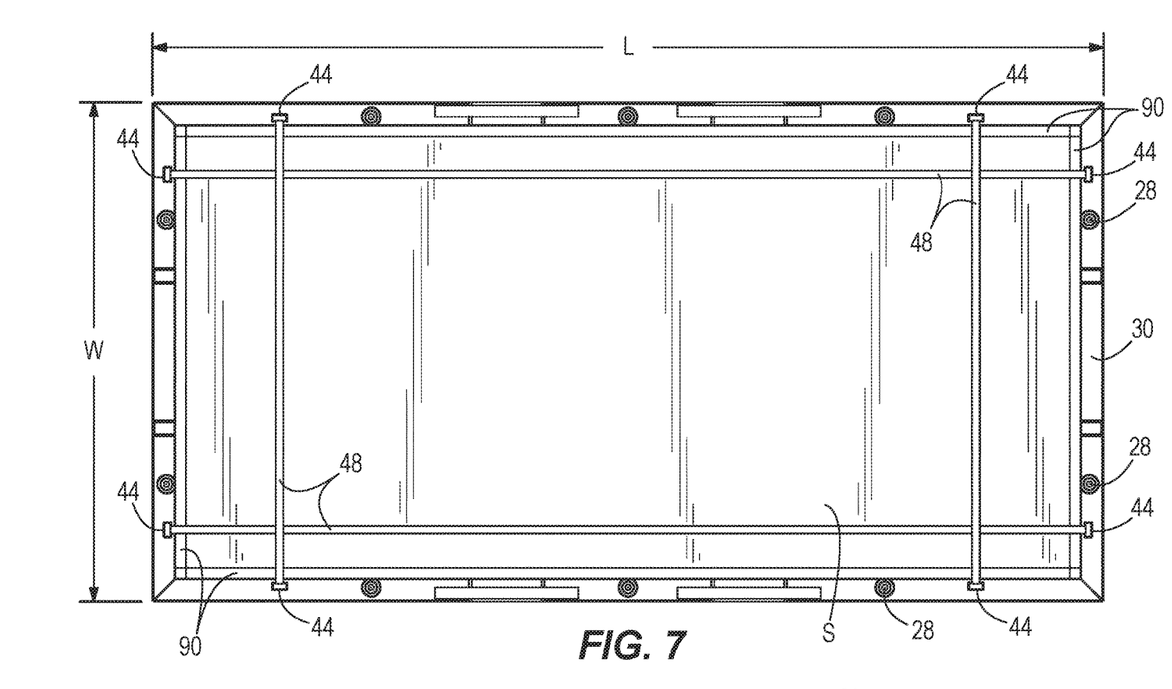
FIG. 7 is a top view of the cartridge of FIG. 1, loaded with a stack of sheet metal and banded securely.
Figure 8:
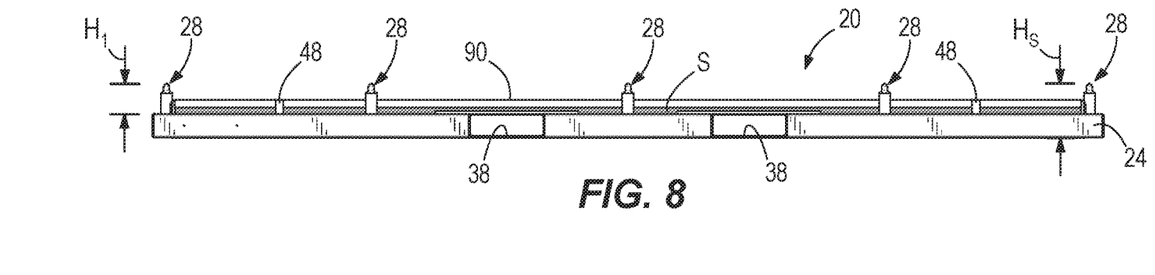
FIG. 8 is a front view of the loaded cartridge of FIG. 7.

As shown in FIGS. 4 and 6, each support tube 40 is formed with a main body 64 defining an axis A, shared with the corresponding pin 28 and the corresponding openings 60, and a cross-sectional profile (e.g., hollow cylindrical) taken transverse to the axis A. At each axial end, each support tube 40 further includes a boss 68 sized and shaped for fitting into the corresponding one of the openings 60. The bosses 68 are areas of reduced cross-sectional dimension and/or alternate cross-sectional shape compared to the main body 64. The main body 64 of the support tube 40 has a cross-section size that prevents it from being received into the openings 60. As such, the support tube 40 extends between and connects the upper wall 52 and the lower wall 54. The overall axial height of each support tube 40 exceeds an axial dimension of the space between the upper wall 52 and the lower wall 54 prior to assembly so that the perimeter frame member 30 is resiliently flexed or splayed open to allow assembly of the support tube 40 into the openings 60 at each pin location. In this regard, the support tubes 40 are assembled into place by sliding in between the upper and lower walls 52, 54 from an open end of the perimeter frame member 30, before the perimeter frame members 30 are assembled together to form the frame 24. Once inserted, each support tube 40 is welded into place in the openings 60.

Each pin 28 extends along the axis A and defines a first section $28_1$ adjacent a first end 28A having a first cross-sectional dimension $D_1$ and a second section $28_2$ adjacent a second end 28B having a second cross-sectional dimension $D_2$ smaller than the first cross-sectional dimension $D_1$. In the illustrated construction, the first and second sections $28_1$, $28_2$ are cylindrical in shape, and the first and second cross-sectional dimensions $D_1$, $D_2$ are diameters. A shoulder 72 is defined at the transition from the first section $28_1$ to the second section $28_2$. The second end 28B of the pin 28 has a tapering shape as a cone, rounded-tip cone, frustum, elliptical cone, parabolic cone, or hemisphere that decreases in cross-sectional dimension from the second section $28_2$ having the second cross-sectional dimension $D_2$.

Each support tube 40 has an interior aperture or cavity 80 dimensioned to receive a corresponding one of the pins 28 in the first orientation (FIGS. 4-6) in which the first section $28_1$ of the pin 28 having the larger cross-sectional dimension $D_1$ is inserted into a first or upper section 80A of the cavity 80 while the second section $28_2$ having the smaller cross-sectional dimension $D_2$ is spaced out above the support tube and the upper surface $24_U$. As shown in FIG. 6, the first end 28A of the pin 28 abuts a shoulder 82 of the cavity 80. The first section $28_1$ of the pin is dimensioned in relation with the upper section 80A of the cavity 80 to provide a location fit or a clearance fit that does not preclude insertion or removal by hand. In the first orientation, a second or lower section 80B of the cavity 80 having a smaller cross-sectional dimension than the upper section 80A is left unoccupied by the pin 28. The lower section 80B of the cavity is dimensioned in relation with the second section $28_2$ (of a pin 28 of another cartridge 20) to provide a location fit or a clearance fit that does not preclude insertion or removal by hand. For a given cartridge 20, the upper cavity section 80A along with the opening 60 in the upper wall 52 constitutes an upper opening of the frame 24 for receiving a pin 28 of the cartridge 20, and the lower cavity section 80B along with the opening 60 in the lower wall 54 constitutes a lower opening of the frame 24 for receiving a pin 28, which may be a pin 28 of the cartridge 20, or another adjacent cartridge 20 stacked underneath the cartridge 20 as discussed in further detail below.

Figure 5:
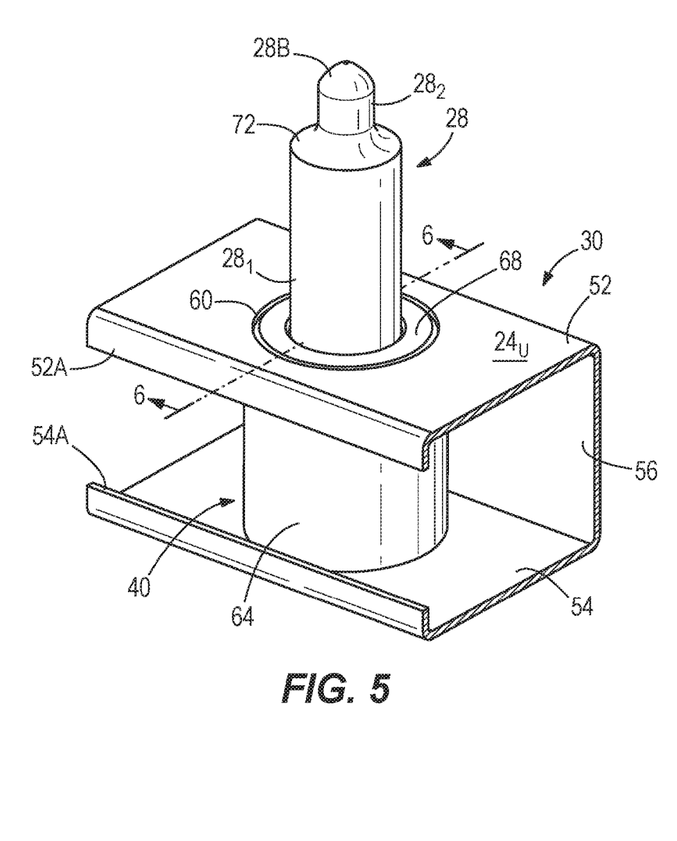
FIG. 5 is a perspective view of the portion of the cartridge shown in FIG. 4, illustrating the pin installed in a first orientation for stacking.
Figure 9:
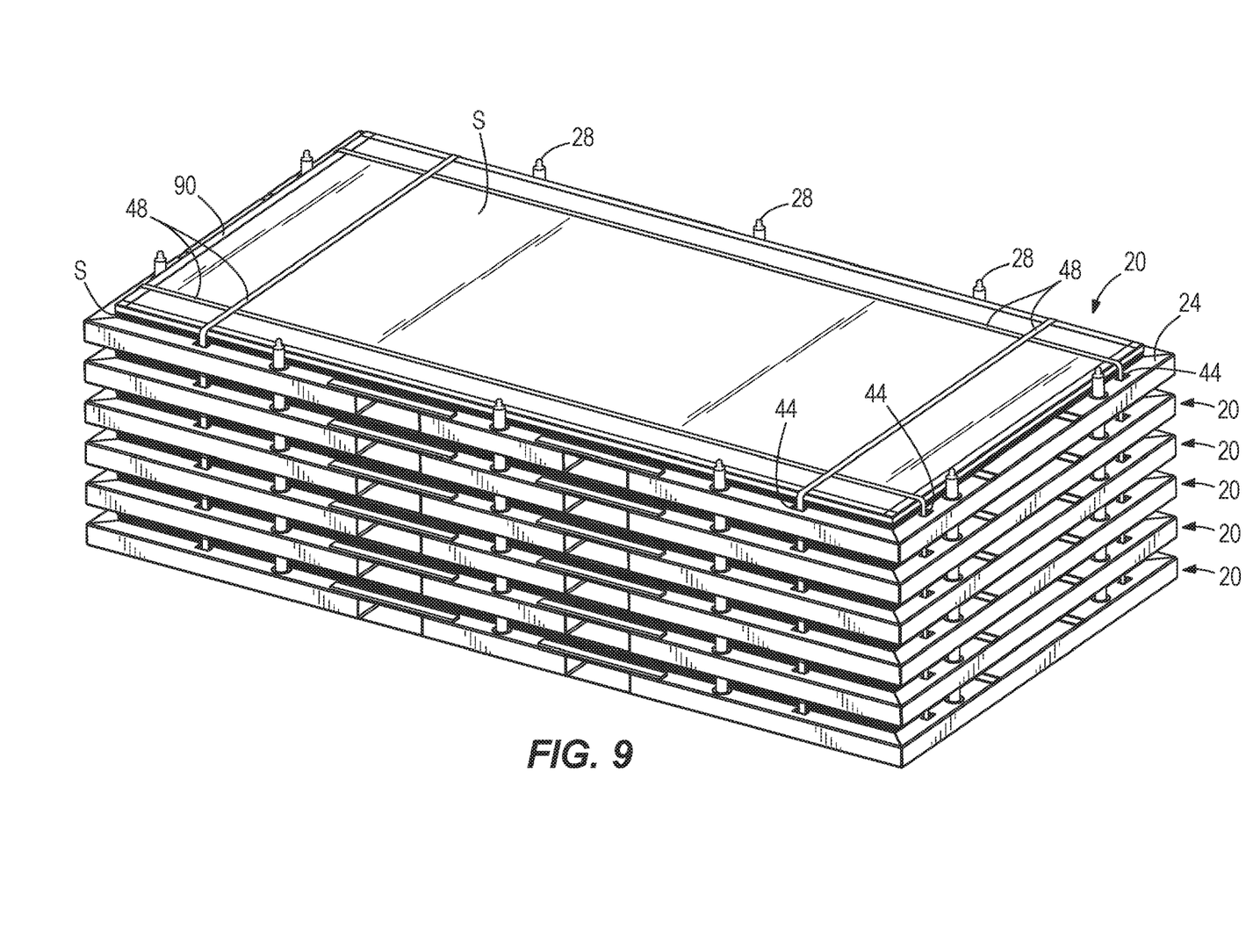
FIG. 9 is a perspective view of a plurality of vertically-stacked loaded cartridges of FIGS. 7 and 8.
Figure 10:
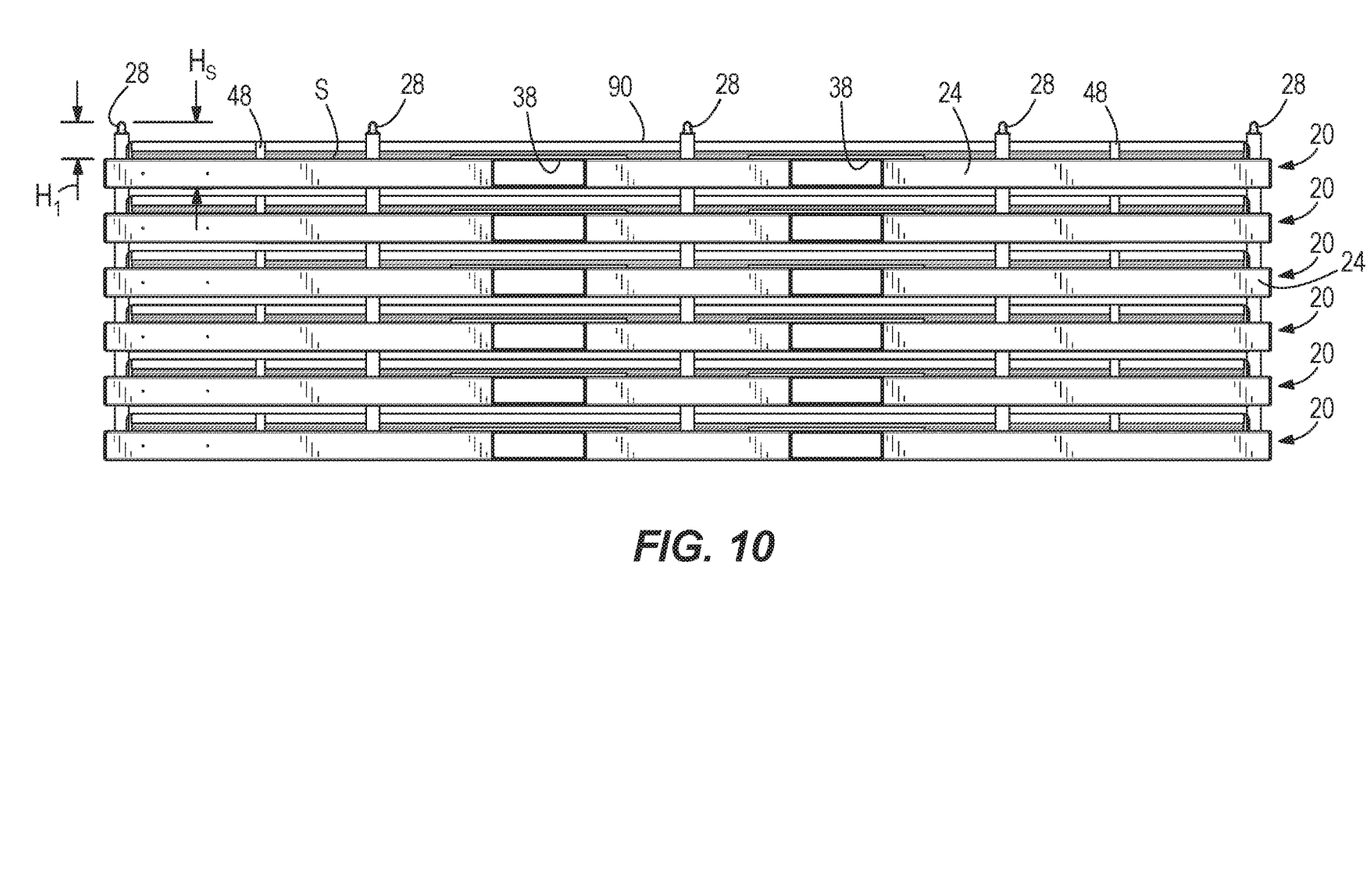
FIG. 10 is a front view of the plurality of vertically-stacked loaded cartridges of FIG. 9.

When the pin 28 is received in the first orientation in the support tube 40 as shown in FIGS. 4-6, the pin 28 protrudes a first height $H_1$ from the upper surface $24_U$. In other words, the second end 28B of the pin 28 is spaced a distance equal to the first height $H_1$ above the upper surface $24_U$. The first height $H_1$ is equal to an overall axial length of the pin 28 minus an axial distance from the upper surface $24_U$ to the shoulder 82 of the cavity 80, as shown in FIG. 6. Also shown in FIG. 6, a stacking height $H_S$ is defined as the distance between the lower surface $24_L$ of the frame 24, which constitutes the bottom of the cartridge 20, and the second end 28B of the pin 28. With the pins 28 in the first orientation, a plurality of cartridges 20 can be vertically stacked one on top of the other as shown in FIGS. 9 and 10, such that the shoulder 72 of each pin 28 provides a support surface for supporting another cartridge 20. Each layer of the stack has a height equal to the stacking height $H_S$ minus a distance from the shoulder 72 to the second end 28B. To stack cartridges 20 as shown, the second section $28_2$ of all the pins 28 of a lower disposed cartridge 20 are inserted and received into the lower section 80B of the respective support tube cavities 80. The shoulder 72 of each pin 28 abuts the bottom end 40B of the support tube 40 so that the lower surface $24_L$ of the upper disposed cartridge 20 is supported by all the shoulders 72 of all the pins 28 of the lower disposed cartridge 20. The bottom end 40B of each support tube 40 is formed with an inlet funnel 86 formed as a tapered guide surface to help guide the second end 28B of the pin 28 into the second section 80B of the cavity 80 upon minor misalignment. From the bottom end 40B, the funnel 86 can begin tapering axially toward the lower cavity section 80B at a cross-sectional dimension $D_3$ that is at least 1.5 times the cross-sectional dimension $D_2$ of the second pin section $28_2$. Although each cartridge 20 is shown in FIGS. 9 and 10 to be loaded with items (e.g., material sheets S such as sheet metal stock) secured to the individual cartridge 20 with banding straps 48, a stack may be formed by any combination of fully-loaded, partially-loaded, or empty cartridges 20. As will be appreciated from FIGS. 7-10, the respective first sections $28_1$ of the plurality of pins 28 of a given cartridge 20 operate to contain the material sheets S or other product interior to a perimeter defined by the pins 28, which is inward of the exterior perimeter of the cartridge 20 as defined by the outer walls 56 of the perimeter frame members 30. Thus, the pins 28 keep the material sheets S neatly stacked on the cartridge 20 and help protect the edges of the material sheets S from damage at all times until the material sheets S are to be removed from the cartridge 20 for use. The pins 28 also protect the sharp corners of the raw sheet stock from being exposed to material-handling operators.

Figures 14, 15:
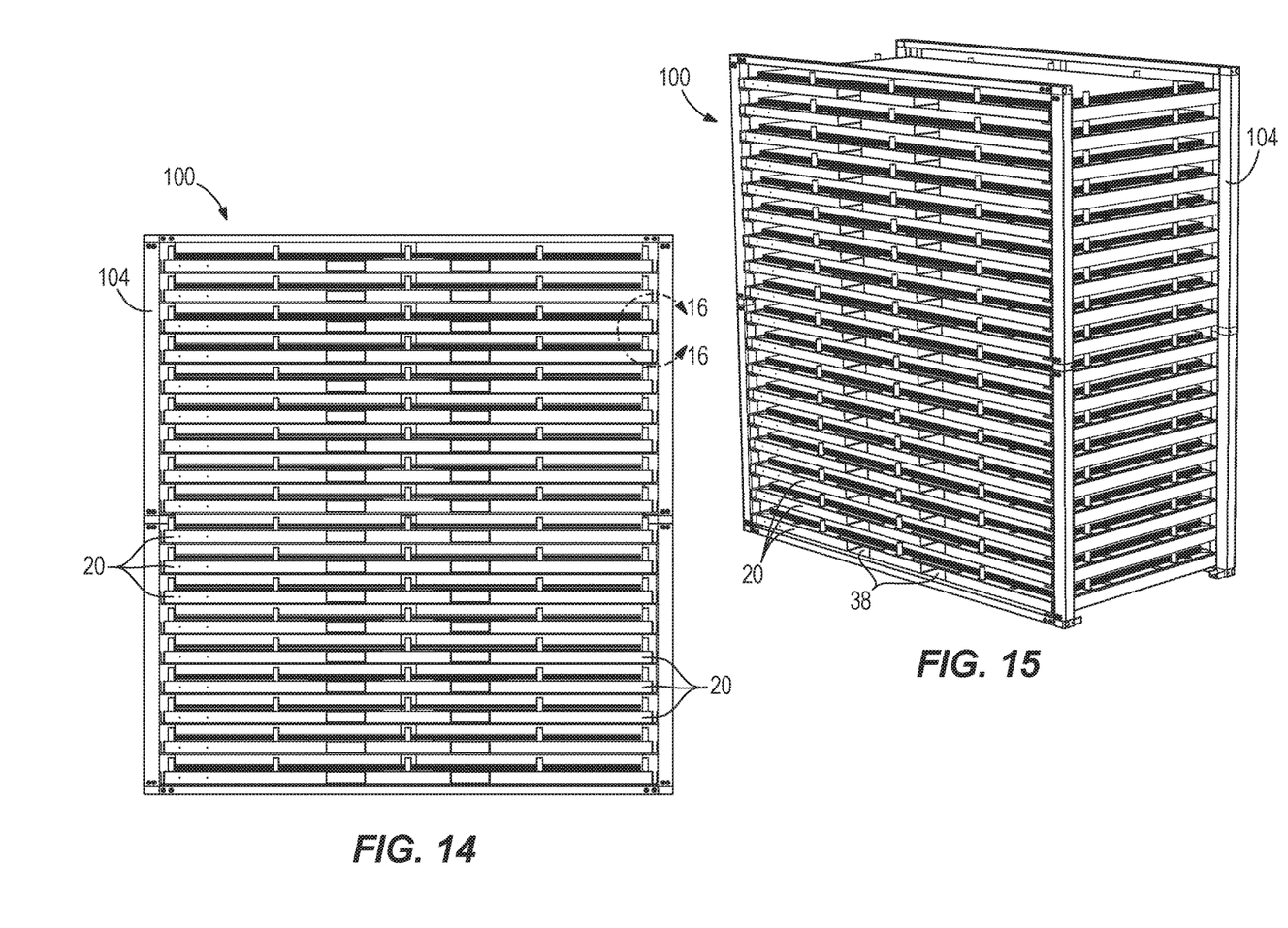
FIG. 14 is a front view of a rack system including a rack and a plurality of loaded cartridges.
FIG. 15 is a perspective view of the rack system of FIG. 14.
Figure 16:
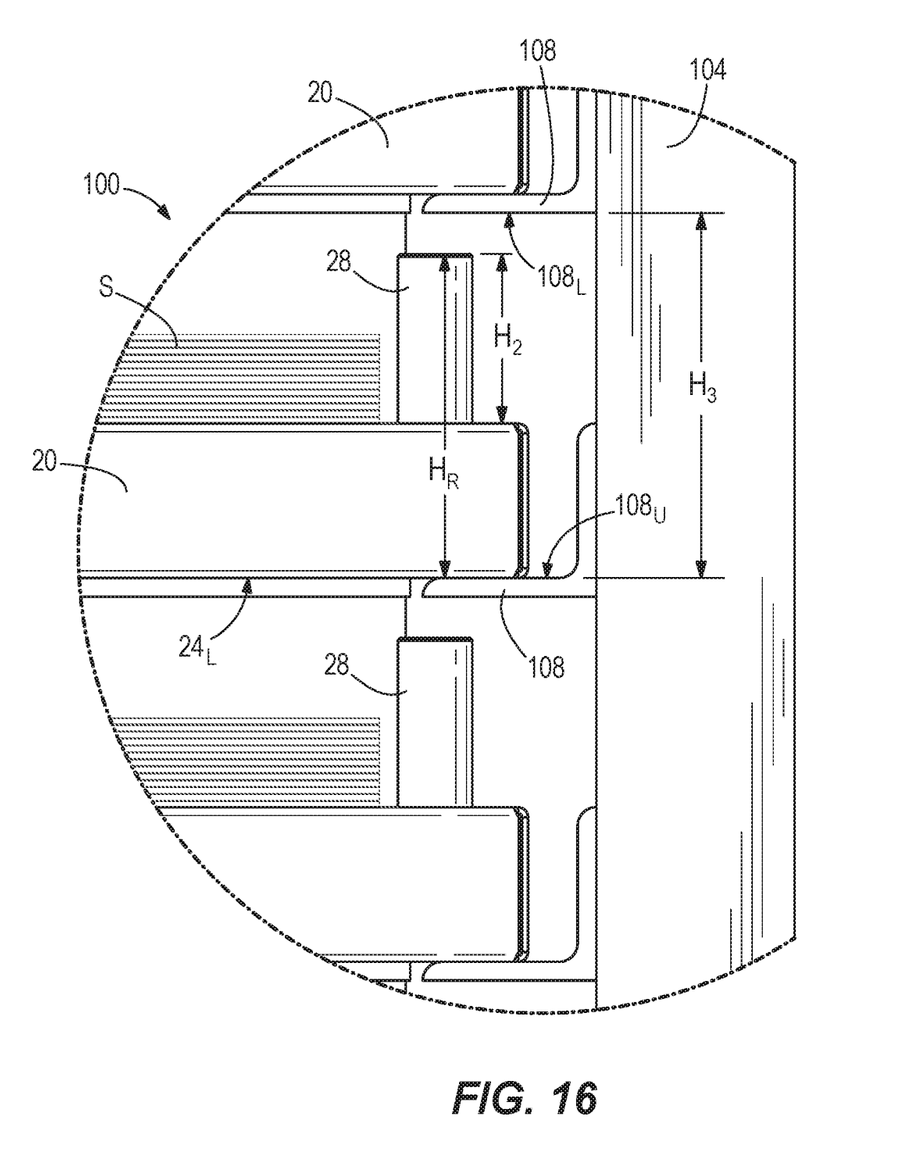
FIG. 16 is a detail view of an edge portion of the rack system of FIG. 14.

Optionally, as shown, additional edge protectors 90 (e.g., folded cardboard strips) can be positioned over all the edges of the material sheets S. The edge protectors 90 can be used at least when secured by the banding straps 48 for maximum protection during shipping. However, it may be desirable to remove the edge protectors 90 and the banding straps 48 once the cartridges 20 are located at a final destination, for example, a rack system 100 of FIGS. 14-16 provided at a location where the material sheets S will be removed from the cartridges 20 for use (e.g., in manufacturing).

Figure 11:
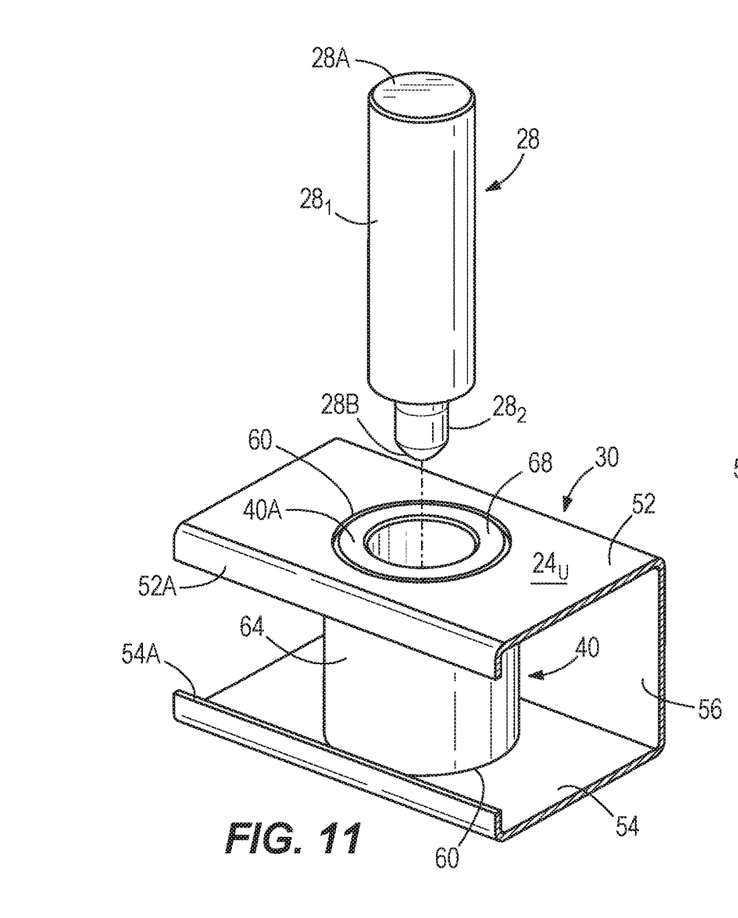
FIG. 11 is an exploded assembly view of a portion of the cartridge of FIG. 1, wherein the removable pin is reversed to a second orientation for racking.
Figure 12:
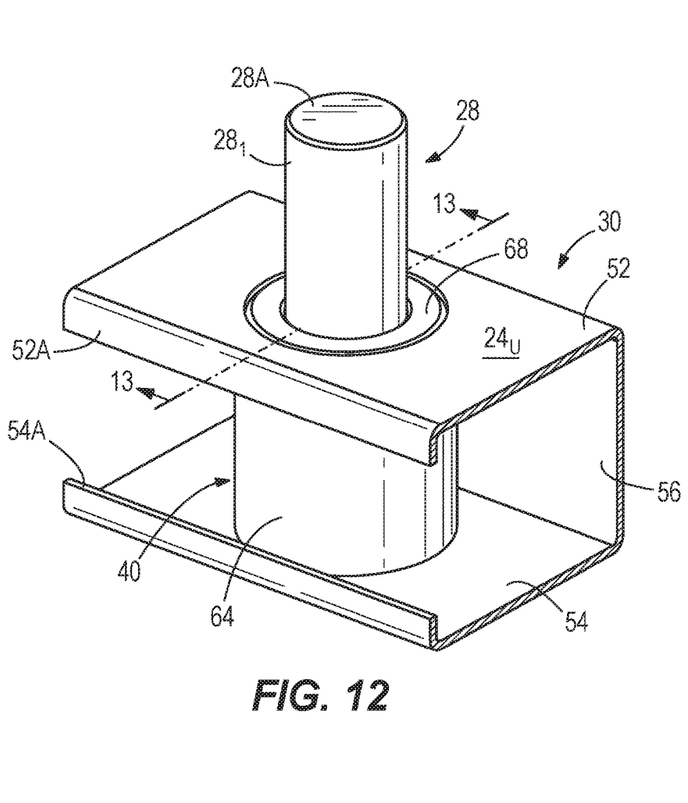
FIG. 12 is a perspective view of the portion of the cartridge shown in FIG. 11, illustrating the pin installed in the racking orientation.
Figure 13:
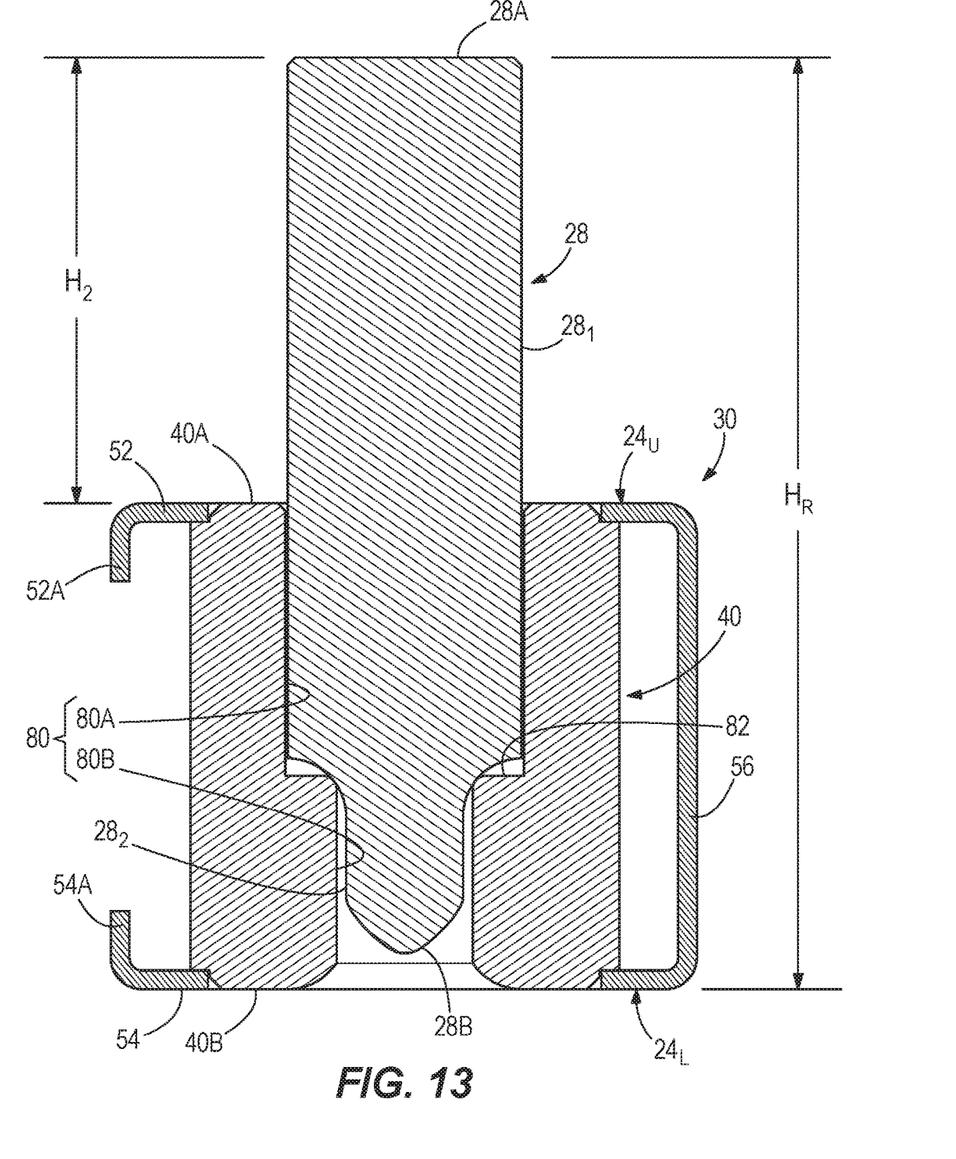
FIG. 13 is a section view taken along line 13-13 of FIG. 12, illustrating the pin in the racking orientation.

For use of the cartridges 20 as part of the rack system 100, some or all of the pins 28 are re-configured from the first orientation to the second orientation with respect to the frame 24 as shown in FIGS. 11 and 12. This involves removing the pins 28, axially reversing them to the second orientation, and reinserting into the support tubes 40 in the second orientation as shown in FIGS. 11 and 12. In the second orientation, the second section $28_2$ and second end 28B of each pin 28 extend down into the cavity 80 past the shoulder 82 and into the second cavity section 80B. The pin 28 is fully seated in the second orientation when the shoulder 72 of the pin 28 abuts the shoulder 82 of the cavity 80. In the second orientation, each pin 28 extends a second height $H_2$ from the upper surface $24_U$. The second height $H_2$ is less than the first height $H_1$, for example a reduction of at least 15 percent, at least 20 percent, or at least 25 percent from the first height $H_1$. It is also noted that, in the second orientation, almost the entire axial span of the cavity 80, including both cavity sections 80A, 80B between the first and second ends 40A, 40B of the support tube 40, is occupied by the pin 28 (e.g., over 80 percent, or over 90 percent). By tucking a greater axial span of the pins 28 into the cavities 80, the overall height of the cartridge 20, measured from the lower wall $24_L$ to the first end 28A of the pin 28, is reduced from the stacking height $H_S$ of FIG. 6 to a racking height $H_R$ of FIG. 13.

The rack system 100 further includes a rack or rack frame 104 defining a plurality of rack spaces. Each rack space is dimensioned to receive one cartridge 20 supported on a shelf or ledge 108 of the rack frame 104. This provides for the material sheets S of each cartridge 20 to be directly accessible by removal from the rack frame 104 individually, without having to unstack or otherwise displace any other cartridges 20. The rack spaces can all be of equal height for maximum flexibility, but other constructions can provide rack spaces of at least two different sizes. The rack system 100 is shown with rack spaces for eighteen cartridges 20, but the rack frame 104 may be provided with any desired number of rack spaces. The height $H_3$ of a rack space is measured between an upper surface $108_U$ of one ledge 108 and a lower surface $108_U$ of the next highest ledge 108 as best shown in FIG. 16. Because the pins 28 are not utilized for stacking additional cartridges 20 when used with the rack system 100, the extent of the pins 28 above the upper surface $24_U$ (i.e., the second height $H_2$) is dimensioned closer to the height of a full stack of items, such as the material sheets S, designating a full cartridge 20. As such, the vertical clearance required between the height $H_3$ of the rack space and the cartridge racking height $H_R$ is set at the desired amount, independent of the first height $H_1$ or the stacking height $H_S$, for maximizing space efficiency. In some constructions, the height $H_3$ of the rack space is less than the stacking height $H_S$ of the cartridge 20 with the pins 28 in the first orientation, thus preventing the use of the cartridge 20 with the rack system 100 when the pins 28 are in the first orientation.

The above-described rack and cartridge system can be used as described below to perform a method for product shipping and storing products. Initially, a plurality of cartridges 20 is provided, and a plurality of pins 28 is assembled in each cartridge in the first orientation for stacking so that the first ends 28A are received in the support tubes 40 and the second ends 28B extend up above the upper surface $24_U$. Material sheets S or other items are placed onto each upper surface $24_U$ in the area between the pins 28 of each cartridge 20 so that the material sheets S are laterally contained on the cartridge 20 by the pins 28. The material sheets S on each cartridge 20 can be further secured to the frame 24 by passing one or more banding straps 48 through the banding tubes 44. Multiple cartridges 20 are stacked vertically by picking up a loaded cartridge 20 and placing it above another cartridge 20 so that the pins 28 of the lower cartridge 20 are in alignment with the lower cavity sections 80B in the upper cartridge frame 24. Minor misalignment is accommodated by the inlet funnels 86. The upper cartridge 20 can then be lowered onto the pins 28 of the lower cartridge 20. The process can be repeated for any desired number of cartridges 20 to be provided in a given stack for shipping. The cartridges 20 are loaded and stacked at a source location (e.g., a facility at which material sheets S are manufactured) for subsequent delivery to a destination location (e.g., a manufacturing facility that uses material sheets S in production of other products). Placement of cartridges 20 can be accomplished by operation of a fork lift, with forks thereof being inserted into the fork tubes 36, and a finished stack of cartridges 20 can be loaded into a truck, trailer, rail car, etc. for shipment. Once delivered to the destination, the cartridges 20 can be unstacked (e.g., again using a fork lift if desired). The pins 28 of each cartridge 20 are removed, reversed, and inserted back into the upper cavity sections 80A in the second orientation. Each cartridge 20, now configured for racking, can be inserted into a corresponding rack space of the rack frame 104 provided at the destination location. In one example, the rack frame 104 is configured with a plurality of cartridges 20, and each cartridge 20 contains material sheets S of a unique type (e.g., unique combinations of material and sheet thickness). Over time, manufacturing processes at the destination location may deplete the material sheets S from one or more cartridges 20, and the depleted cartridges 20 can be removed from the rack frame 104 and returned to the source location for replenishment.

Various features and advantages of the invention are set forth in the following claims.

The invention claimed is:

1. A material-supporting cartridge comprising:
   a frame adapted to support an item, the frame including a periphery having an upper surface with an opening; and
   a pin removably positioned in the opening in a first orientation with a first end of the pin positioned in the frame and a second end of the pin positioned a first height above the upper surface, the pin being dimensioned to be removed and inserted into the opening in a second orientation with the second end of the pin positioned in the frame and the first end of the pin positioned a second height above the upper surface, the first height being greater than the second height, wherein the pin includes a first portion having a larger cross-sectional dimension than a second portion of the pin, a shoulder being defined between the first and second portions of the pin,
   wherein in the first orientation, the first end of the pin is positioned in an upper section of a cavity within the frame while the second portion of the pin and the shoulder are spaced above the upper surface of the frame, and
   wherein in the second orientation, the shoulder of the pin is positioned in the cavity with the second portion of the pin extending down into a lower section of the cavity.

2. A material-supporting cartridge as claimed in claim 1, wherein the frame includes a plurality of the openings around the periphery of the frame and a plurality of the pins removably positioned in the openings.

3. A material-supporting cartridge as claimed in claim 2, wherein the first end of each pin includes a first cross-sectional dimension and the second end of each pin includes a second cross-sectional dimension, and wherein the second cross-sectional dimension is smaller than the first cross-section dimension.

4. A material-supporting cartridge as claimed in claim 1, wherein the periphery of the frame is formed by a truss having an upper wall, a lower wall, and a space between the upper and lower walls, and wherein the frame further includes a support tube aligned with the opening and connecting the upper wall to the lower wall, the support tube defining the cavity that receives the pin in each of the first and second orientations.

5. A material-supporting cartridge as claimed in claim 4, wherein the frame further includes a banding tube connecting the upper wall to the lower wall and providing a passageway through the periphery of the frame to facilitate insertion of a banding strap to secure the item.

6. A material-supporting cartridge as claimed in claim 5, wherein the frame includes corners, and wherein the banding tube is positioned between the support tube and one of the corners.

7. A material-supporting cartridge as claimed in claim 6, wherein the frame include a plurality of banding tubes and a plurality of the support tubes, and wherein each corner is flanked by two banding tubes with no support tubes in between.

8. A material-supporting cartridge as claimed in claim 1, wherein the frame has a rectangular shape defined by two long sides and two short sides, and wherein the frame further includes two fork tubes spaced from each other and extending between the long sides to facilitate insertion of forks of a forklift.

9. A material-supporting cartridge as claimed in claim 1, wherein the periphery of the frame is at least partially formed by a C-shaped truss having an upper wall, a lower wall, and an outer wall such that an inner portion of the truss is at least partially open.

10. A material-supporting cartridge as claimed in claim 1, wherein the cavity defines a shoulder at a lower end of the upper section and wherein the pin is supported by the shoulder in the first and second orientations.

11. A method of shipping and receiving a plurality of cartridges, each having a frame and a pin, each pin having a first portion having a larger cross-sectional dimension than a second portion of the pin such that a shoulder is defined therebetween, and each frame having a cavity with an upper section and a lower, smaller section, the method comprising:

inserting the pin in a first orientation into an upper opening in each frame so that the first portion of the pin is positioned in the upper section of the cavity within the frame, above the lower, smaller section of the cavity and the shoulder is spaced above an upper surface of the frame having the upper opening;

placing an item onto each cartridge;

stacking the cartridges such that the pin of one cartridge is inserted into a lower opening of a cartridge above and positioned in the lower, smaller section of the cavity within the frame of the cartridge above such that the cartridge above is supported by the shoulder of the pin; and moving the cartridges to a different location.

12. A method as claimed in claim 11, wherein inserting includes inserting a plurality of pins into a plurality of upper openings, respectively.

13. A method as claimed in claim 12, wherein placing includes positioning the item between the plurality of pins.

14. A method as claimed in claim 13, wherein stacking includes inserting each of the pins into a corresponding lower opening in the cartridge above.

15. A method as claimed in claim 11, further comprising:
repositioning the pin in a second orientation relative to the frame; and
supporting the cartridge on a rack with the pin in the second orientation.

16. A method as claimed in claim 15, wherein the first orientation corresponds with a first end of the pin positioned in the frame and a second end of the pin positioned a first height above an upper surface of the frame, the second orientation corresponds with the second end of the pin positioned in the frame and the first end of the pin positioned a second height above the upper surface, and the first height is greater than the second height.

17. A material-supporting cartridge and rack system comprising:
a cartridge including:
a frame adapted to support an item, the frame including a periphery having an upper surface including an opening and a lower surface opposite the upper surface; and
a pin removably positioned in the opening in a first orientation with a first end of the pin positioned in the frame and a second end of the pin positioned a first height above the lower surface, the pin being dimensioned to be removed and inserted into the opening in a second orientation with the second end of the pin positioned in the frame and the first end of the pin positioned a second height above the lower surface, the first height being greater than the second height; and
a rack defining multiple stacked rows having a vertical spacing between adjacent rows, wherein the vertical spacing is greater than the second height and less than the first height.

18. A system as claimed in claim 17, wherein the frame includes a plurality of the openings around the periphery of the frame and a plurality of the pins removably positioned in the openings.

19. A system as claimed in claim 18, wherein the first end of each pin includes a first cross-sectional dimension and the second end of each pin includes a second cross-sectional dimension, and wherein the first cross-sectional dimension is smaller than the first cross-section dimension.

20. A system as claimed in claim 19, wherein the pin includes a first cylindrical portion adjacent the first end and a second cylindrical portion adjacent the second end, and wherein a diameter of the first cylindrical portion is smaller than a diameter of the second cylindrical portion.

* * * * *